US011803590B2

(12) United States Patent
Durairaj et al.

(10) Patent No.: US 11,803,590 B2
(45) Date of Patent: Oct. 31, 2023

(54) SMART AND INTERACTIVE BOOK AUDIO SERVICES

(71) Applicant: Dell Products L. P., Round Rock, TX (US)

(72) Inventors: Arockiaraj Durairaj, Bengaluru (IN); Chetan Somaiah, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 575 days.

(21) Appl. No.: 16/192,888

(22) Filed: Nov. 16, 2018

(65) Prior Publication Data

US 2020/0159767 A1 May 21, 2020

(51) Int. Cl.
| | | |
|---|---|---|
| *G06F 16/635* | (2019.01) | |
| *G06F 16/632* | (2019.01) | |
| *G06F 16/903* | (2019.01) | |
| *G06F 16/638* | (2019.01) | |
| G06F 16/435 | (2019.01) | |
| G06F 16/2457 | (2019.01) | |
| G09B 21/00 | (2006.01) | |
| G06F 16/248 | (2019.01) | |
| G06F 16/9535 | (2019.01) | |
| G06Q 30/0251 | (2023.01) | |
| H04N 21/234 | (2011.01) | |

(Continued)

(52) U.S. Cl.
CPC .......... *G06F 16/635* (2019.01); *G06F 16/632* (2019.01); *G06F 16/638* (2019.01); *G06F 16/90335* (2019.01); G06F 16/248 (2019.01); G06F 16/24575 (2019.01); G06F 16/437 (2019.01); G06F 16/9535 (2019.01); G06Q 30/0269 (2013.01); G09B 21/00 (2013.01); G09B 21/001 (2013.01); G10L 15/08 (2013.01); H04N 21/2387 (2013.01); H04N 21/23424 (2013.01)

(58) Field of Classification Search
None
See application file for complete search history.

(56) References Cited

U.S. PATENT DOCUMENTS

| | | | | |
|---|---|---|---|---|
| 8,156,116 B2 * | 4/2012 | Graham | ............. | G06Q 30/0241 707/728 |
| 8,584,042 B2 * | 11/2013 | Erol | ........................ | G10L 13/00 715/838 |
| 9,213,705 B1 * | 12/2015 | Story, Jr. | ............. | G06F 16/4393 |

(Continued)

*Primary Examiner* — Amresh Singh
(74) *Attorney, Agent, or Firm* — Krishnendu Gupta; Deepika Bhayana; Derek Lam

(57) ABSTRACT

In some examples, a computing device may initiate audible play back of a book in response to an instruction from a user. While the book is being audibly played back, the computing device may determine (e.g., in the background) that a content of a recently played back portion of the book matches one or more interests associated with a user, initiate a search, and receive search results. The computing device may re-rank the search results based on the user's interests, pause play back of the book, and audibly read out the re-ranked search results. If the user asks a question, the computing device may pause play back of the book, perform an additional search, and read out loud the additional search results. The computing device may resume the audible play back of the book after the user provides a resume play back instruction.

17 Claims, 4 Drawing Sheets

(51) Int. Cl.
*H04N 21/2387* (2011.01)
*G10L 15/08* (2006.01)

(56) References Cited

U.S. PATENT DOCUMENTS

| | | | | |
|---|---|---|---|---|
| 9,286,287 | B1* | 3/2016 | Tierney | G06F 40/242 |
| 9,286,910 | B1* | 3/2016 | Li | G06F 16/3329 |
| 9,348,554 | B2* | 5/2016 | Story, Jr. | G06F 3/165 |
| 9,703,936 | B2* | 7/2017 | Ochmanek | H04L 67/1097 |
| 9,973,910 | B1* | 5/2018 | Dannamaneni | H04W 4/21 |
| 10,531,157 | B1* | 1/2020 | Loritsch | G06F 3/165 |
| 2003/0013073 | A1* | 1/2003 | Duncan | G09B 5/02 |
| | | | | 434/317 |
| 2011/0164066 | A1* | 7/2011 | Beals | G06F 1/1626 |
| | | | | 345/685 |
| 2011/0307623 | A1* | 12/2011 | George | G06F 9/451 |
| | | | | 709/231 |
| 2012/0209706 | A1* | 8/2012 | Ramer | G06Q 30/0269 |
| | | | | 705/14.51 |
| 2014/0278430 | A1* | 9/2014 | Wexler | G06F 40/279 |
| | | | | 704/260 |
| 2014/0317112 | A1* | 10/2014 | Maharajh | G06F 16/957 |
| | | | | 707/736 |
| 2015/0150046 | A1* | 5/2015 | Maharajh | G06Q 30/0267 |
| | | | | 725/34 |
| 2015/0289025 | A1* | 10/2015 | McLeod | H04N 21/2668 |
| | | | | 725/42 |
| 2015/0324848 | A1* | 11/2015 | Graham | G06Q 30/0256 |
| | | | | 705/14.54 |
| 2017/0178692 | A1* | 6/2017 | Wouhaybi | H04N 21/437 |
| 2017/0201779 | A1* | 7/2017 | Publicover | H04N 21/2668 |
| 2019/0268632 | A1* | 8/2019 | Foerster | H04N 21/44226 |

* cited by examiner

SMART AND INTERACTIVE BOOK AUDIO SERVICES

BACKGROUND OF THE INVENTION

Field of the Invention

This invention relates generally to computing devices and, more particularly to interacting with a book reader application being executed by a computing device.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional audio books are a relatively monotonous way of reading the content to listeners. For example, the audio book may be in the form of a pre-recorded audio file. Such a presentation does not offer listeners an opportunity to interact and request clarification on the content of the audio book.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may (i) ask a user one or more questions and receive one or more answers in response, (ii) perform a first analysis of a browser history of an internet browser application, (iii) perform a second analysis of posts made by the user on one or more social media sites, and (iv) perform a third analysis of files (e.g., including music files, video files, audio books, books, and documents stored on the computing device). The computing device may determine one or more interests associated with a user based at least in part on the one or more answers, the first analysis, the second analysis, and the third analysis. The computing device may determine an approximate age of the user, an approximate education level (e.g., high school, college, University, post-graduate, or the like) associated with the user, an education specialty (e.g., a major, a concentration, or another type of specialization based on the courses taken, or the like) associated with the user, and determine an approximate location of the user (e.g., using a GPS or other location system included in the computing device). The computing device may receive a first instruction to audibly play back a book and, in response, initiate audible play back of the book. For example, the computing device may initiate audible play back of the book (i) by playing back an audio file that includes a human reading the book or (ii) by converting to audio, using a text-to-speech converter, text included in the book (e.g., in the form of a document). The computing device may determine, while the book is being audibly played back, that a content of a recently played back portion of the book matches at least one interest of one of more interests associated with the user. For example, while the book is being audibly played back, the computing device may execute a background process to: (i) determine the content in the recently played back portion of the book, (ii) perform a comparison of the content with the one or more interests associated with the user, (iii) and (iv) determine, based on the comparison, that the content in the recently played back portion of the book matches the at least one interest of the one or more interests associated with the user. The computing device may send, while the book is being audibly played back, a search request to a search engine. The search request may be formulated based on the content in the recently played back portion of the book and the at least one interest. The computing device may receive search results from the search engine, pause the audible play back of the book, and read out loud (e.g., using a text-to-speech converter) the search results. For example, while the book is being audibly played back, the computing device may receive search results from the search engine (e.g., in response to sending the search request to the search engine). The computing device may re-rank the search results based on the one or more interests associated with the user to create re-ranked search results, and audibly read out the re-ranked search results. The computing device may receive a first instruction and pause audible play back of the book. The computing device may receive a second instruction to provide more information about the content in the recently played back portion of the book and send a second search request to the search engine that is formulated based on the content in the recently played back portion of the book. The computing device may receive second search results from the search engine and audibly play back at least a portion of the second search results. The computing device may resume the audible play back of the book in response to the user providing a resume instruction.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
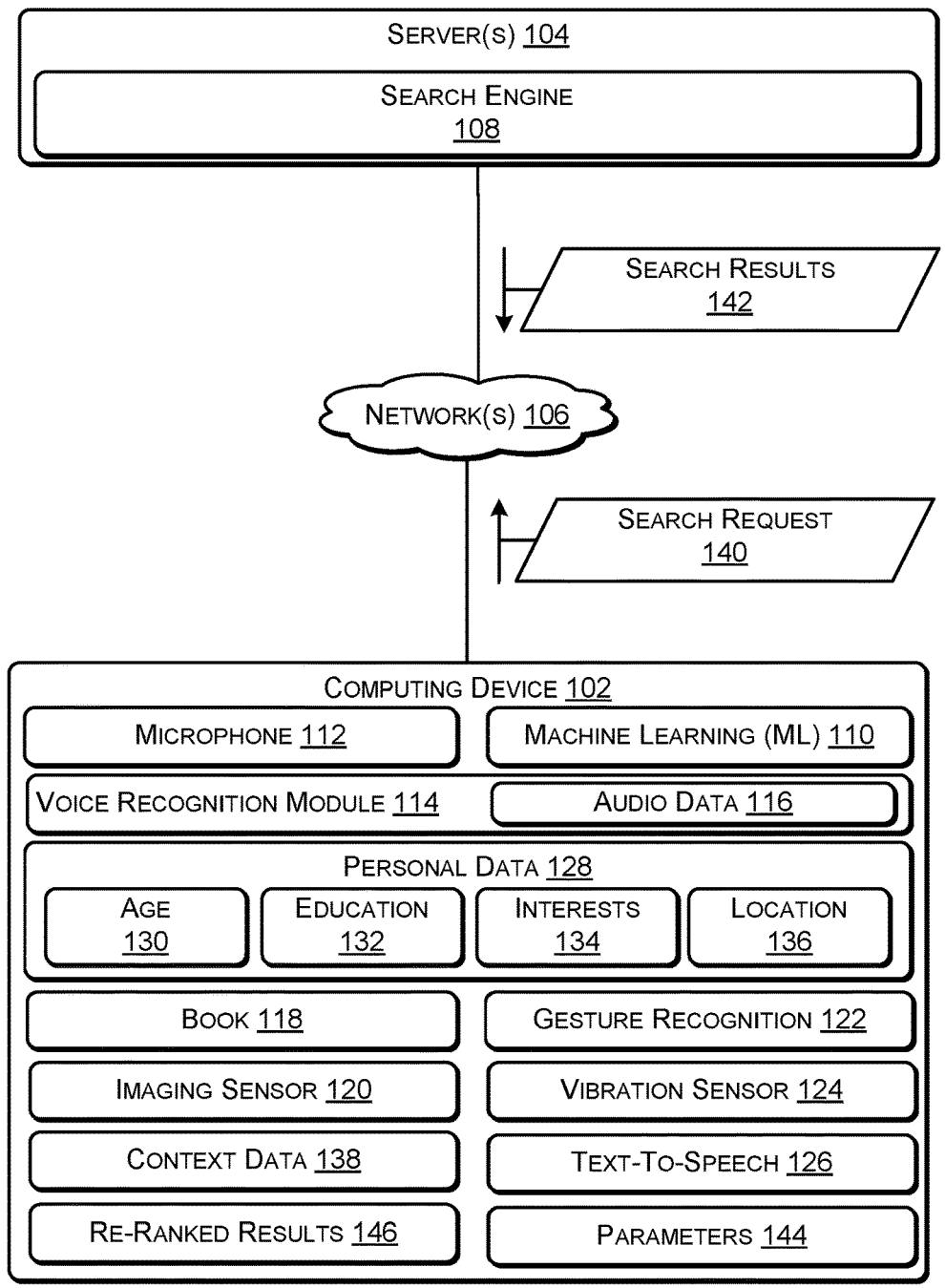
FIG. 1 is a block diagram of a system that includes a computing device to read content, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable artificial intelligence (e.g., machine learning) to not only read aloud content, such as an audio book, but also engage the listener in a conversation during play back of the audio. The machine learning algorithm, executing on an IHS, may present a user with a wide range of information, based on areas of interest to the user. The machine learning algorithm may pause play back, provide clarification, offer examples, and provide related information based on the user's interests.

When the machine learning algorithm is initially started up by a new user, the algorithm may gather data indicating the user's interests, and update the user's interests periodically. For example, to determine the user's interests, the algorithm may ask the user questions, analyze the user's browser history, analyze the user's postings on social media sites, analyze files (e.g., music files, video files, audio books, books, documents, and the like) stored on the user's computing device (e.g., IHS), and the like. The user may request that a particular book be read out loud. In response, the device may read the book by playing back an audio file or performing speech-to-text conversion of a text-based book. During reading of the book, the listener may, via an audible command or via a gesture (e.g., raise a hand near an imaging device associated with the device, shake the device, or the like), pause play back and ask a question. The device may perform a search, receive search results, re-rank the search results based on the relevancy of each search result to the most recent passages read out from the book, and read out one or more of the re-ranked search results, after which the device may resume play back of the book. In addition, during reading of the book, the device may automatically, using a background process, determine a content of the passages being read and compare them to the user's previously determined interests. If the content of the passages from the book matches the user's interests, the device may automatically perform a search in the background (e.g., while the book is being read), receive results, pause play back of the audio of the book, and ask the user if the user desires to find out more about the content in the passages being read, given the user's similar interests. If the user indicates a desire to hear the results, the device may read out the results of the search to the user. After the user provides a command to resume play back, the device may resume play back of the audio associated with the book. If the user indicates a desire to continue with the book and not hear the results, the device may resume play back of the audio associated with the book.

As an example, a computing device may include one or more processors and a non-transitory computer-readable storage media storing instructions that are executable by the one or more processors to perform various operations. For example, the operations may include asking a user of the computing device one or more questions and receiving one or more corresponding answers in response. The operations may include performing a first analysis of a browser history (e.g., the user's browsing history) of an internet browser application, performing a second analysis of posts made by the user on one or more social media sites, performing a third analysis of files (e.g., including music files, video files, audio books, books, and documents stored on the computing device), and determining one or more interests associated with the user based at least in part on the one or more answers, the first analysis, the second analysis, and the third analysis. The operations may include determining an approximate age of the user, determining an approximate education level associated with the user, determining an education specialty associated with the user, and determining an approximate location of the user, e.g., based at least in part on the one or more answers, the first analysis, the second analysis, and the third analysis. The operations may include receiving a first instruction to audibly play back a book and, in response, initiating audible play back of the book. For example, the computing device may (i) play back an audio file that includes a human reading the book or (ii) convert to audio, using a text-to-speech converter, text included in the book, such as a document. The operations may include determining, while the book is being audibly played back, that a content of a recently played back portion of the book matches at least one interest of one of more interests associated with the user. For example, while the book is being audibly played back, the computing device may execute a background process to: (i) determine the content in the recently played back portion of the book, (ii) perform a comparison of the content with the one or more interests associated with the user, and (iv) determine, based on the comparison, that the content in the recently played back portion of the book matches the at least one interest of the one of more interests associated with the user. The operations may include sending, while the book is being audibly played back, a search request to a search engine. The search request may be formulated based on the content in the recently played back portion of the book and the at least one interest. The operations may include pausing the audible play back of the book and reading out loud, by a text-to-speech converter, search results received from the search engine. For example, reading out the search results received from the search engine may include receiving, while the book is being audibly played back, search results from the search engine in response to sending the search request to the search engine, re-ranking the search results based on the one or more interests associated with the user to create re-ranked search results, and audibly reading out the re-ranked search results. The operations may include resuming the audible play back of the book. The operations may include receiving a second instruction to pause audible play back of the book, pausing audible play back of the book in response to the second instruction. The operations may include receiving a third instruction to provide more information about the content in the recently played back portion of the book and sending an additional search request to the search engine. The additional search request may be formulated based on the content in the recently played back portion of the book. The operations may include receiving additional search results from the search engine and audibly playing back at least a portion of the additional search results.

FIG. 1 is a block diagram of a system 100 that includes a computing device with an enhanced search module according to some embodiments. The system 100 includes a representative computing device 102 coupled to one or more servers 104 via one or more networks 106. The computing device 102 may be a mobile phone, a tablet, a laptop, a netbook, a desktop, or another type of computing device.

The server 104 may be hardware-based, cloud-based, or a combination of both. The server 104 may be part of the Internet (e.g., a network accessible to the public) or part of an intranet (e.g., a private network that is accessible to employees of a company but is inaccessible to others). The server 104 may include a search engine 108 that is capable of performing searches across multiple network-accessible sites.

The computing device 102 may include a machine learning (ML) module 110, a microphone 112, and a voice recognition module 114 that uses natural language processing (NLP) to parse audio data 116 gathered by the microphone 112. The computing device 102 may include a book 118, an imaging sensor (e.g., camera) 120, a gesture recognition module 122, a vibration sensor 124, and a text-to-speech (TTS) module 126. The book 118 may include (1) an audio book having an audio file format (e.g., MP3, WAVE, AAC, or another type of audio format) or (2) an electronic book (eBook), with a format such as PDF, DOC, DOCX, EPUB, MOBI, AZW, LIT, ODF, or another type of electronic book format. If the book 118 is an eBook, the TTS module 126 may be used to convert the text to speech to read the text in the eBook out loud. The imaging sensor 120 may be capable of capturing one or more images (e.g., .jpg or another image format). The gesture recognition module 122 may be capable of identifying one or more user gestures based on the images captured by the imaging sensor 120. A vibration sensor 124 may be capable of sensing vibrations caused by the user tapping on a case of the computing device 102. For example, the user may define a first command (e.g., pause reading of the book 118) in response to the vibration sensor 124 detecting a first tap or a first vibration. The user may define a second command (e.g., initiate or resume reading of the book 118) in response to the vibration sensor 124 detecting two consecutive taps within a predetermined time interval (e.g., X milliseconds, where X>0).

When the computing device 102 determines that a new user is using the computing device 102, the computing device 102 may gather personal data 128 associated with the new user and store the personal data 128 in a memory of the computing device 102. For example, the computing device 102 may gather data associated with the user, such as, for example, an age 130 of the user, an education level 132 of the user, the user's interests 134, a location 136 of the user, and the like. For example, to determine the user's interests 134, the computing device 102 may ask the user questions, analyze the user's browser history (e.g., of an internet browser application), analyze the user's postings on social media sites, analyze files (e.g., music files, video files, audio books, books, documents, and the like) stored on the computing device 102, and the like. The computing device 102 may periodically (e.g., every week, every month, every 6 months, or the like) update the user's interests 134.

The user may instruct the computing device 102 to read out loud a particular book, such as the book 118. For example, the user may say "Read the Hound of the Baskervilles". The microphone 112 may capture what the user said in the form of the audio data 116. The voice recognition module 114 may analyze the audio data 116, determine that the "Hound of the Baskervilles" is a story written by Sir Arthur Conan Doyle, and begin (or resume) reading out loud a portion of the book 118. If the book 118 is an audio file, the voice recognition module 114 may begin (or resume) play back the audio file. If the book 118 is an eBook, the voice recognition module 114 may instruct the TTS module 126 to begin (or resume) reading the book from a particular location. The TTS module 126 may have an associated set of parameters 144 that the user can adjust, such as, for example, a speed of play back, an accent (e.g., British, Australian, East Indian, Southern United States, or the like) in which the audio book is read out loud, a gender (e.g., male or female) of the voice, a pitch of the voice, and the like.

When the computing device 102 is playing (e.g., reading) the book 118, the listener may pause play back of the book 118 via an audible command or via a gesture (e.g., raise a hand near the imaging sensor 120, tap the computing device 102 such that the vibration sensor 124 detects the ta, or the like). When play back of the book 118 is paused, the computing device 102 may store context data 138 that includes a location in the book 118 where play back was paused and information associated with a most recent passage (e.g., sentence, paragraph, section, chapter, or the like) of the book 118 that was played back. After pausing play back, the user may ask a question related to the book 118. The microphone 112 may capture the question in the form of the audio data 116. The voice recognition module 14 may analyze the audio data 116 to determine the information that the user is requesting in the question and send (via the network 106) a search request 140 to the search engine 108.

In response to sending the search request 140 to the search engine 108, the computing device 102 may receive search results 142. The computing device 102 may re-rank the search results 142 to create re-ranked results 146. For example, the computing device 102 may re-rank the search results 142 based on the relevancy of each of the search results 142 to the context data (e.g., the most recent passages read out from the book). The computing device 102 may use the text-to-speech module 126 to read out loud the re-ranked results 146. If the user asks an additional question, the computing device 102 may send an additional search request, receive additional search results, re-rank the additional search results, and read out loud the one or more re-ranked search results. If the user instructs (e.g., via a voice command, via a gesture, or via a vibration inducing tap) the computing device 102 to resume play back of the book 118, the computing device 102 may resume play back of the book 118. For example, the book 118 may mention the country of Costa Rica. The user may pause play back of the book 118 and may ask questions requesting more information on the country of Costa Rica. After listening to the information and obtaining more information on Costa Rica, the device may resume play back of the book 118 at a location in book 118 determined based on the context data 138. Play back of the book 118 may be resumed in response to a command from the user or if no further questions are received from the user within a predetermined time interval (e.g., Z seconds, Z>0, such as, for example, 15 seconds).

When the computing device 102 is reading out loud the book 118, the computing device 102 may automatically, using a process running in the background, determine the context data 138 (e.g., a content of the passages being read from the book 118) and compare (e.g., using the machine learning 110) the context data 138 to the personal data 128 (e.g., including the interests 134). If the context data 138 of the book 118 matches the personal data 128, the computing device 102 may automatically send the search request 140 in the background (e.g., while the book 118 is being read), receive the search results 142, re-rank the search results 142 based on the context data 138 to create the re-ranked results 146. The computing device 102 may pause play back of the book 118, and ask the user if the user desires to find out more about the context data 138 (e.g., content in the passages being read) based on the user's similar personal data 128, including the user's similar interests 134. For example, the context data 138 of the book 118 may match the personal data 128 when there is a greater than a predefined threshold (e.g., 90%, 95%, 98%, or the like) of correlation between the context data 138 and the personal data 128. If the user indicates a desire to hear the re-ranked results 146, the computing device 102 may read out the re-ranked results 146. After the user provides a command (e.g., via a voice command, via a gesture, or via a vibration inducing tap) to resume play back of the book 118, the computing device 102 may resume play back of the book 118. For example, the book 118 may read out loud a passage in which a character in the book 118 drinks coffee from coffee beans grown in Costa Rica. While the book 118 is being played back, the computing device 102 may determine that the user's interests 134 include drinking coffee. While the book 118 is being played back, the computing device 102 may send the search request 140 regarding Costa Rican coffee. After receiving the search results 142, the computing device 102 may re-rank the search results based on the personal data 128 to create the re-ranked results 146. The computing device 102 may pause play back of the book 118 and ask if the user desires to know more about Costa Rican coffee. If the user indicates a desire to know more, the computing device 102 may play back at least a portion of the re-ranked results 146. If the user indicates a desire to resume play back of the book 118, the computing device 102 may resume play back of the book 118.

Thus, a computing device may respond to voice commands provided by a user. The first time that user uses the device, the device may gather personal data associated with the user, including interests of the user. The user may instruct the device to read out an audio version of a book. In response, the device may play back an audio file of a human reading the book or the device may use text-to-speech to convert the text of the book to speech. The user may instruct the device to pause play back and may instruct the device to obtain (e.g., via an internet search) information associated with the content of the book that was recently (e.g., within a predetermined time interval) read out loud. The device may perform a search, re-rank at least a portion of the (e.g., top 10) results based on the user's interests, and read out the portion of the re-ranked results. The user may ask additional questions and the device may perform additional searches, re-rank the additional search results, and read out the re-ranked additional search results until the user instructs the device to resume play back of the book.

When the device is playing back the audio file or when the device is using text-to-speech to convert the text of the book to speech, the device may use a background process to automatically compare contents of the book that were recently (e.g., within a predetermined time interval) read out loud with the user's interests. If the content of the recently read out portion of the book matches a particular interest of the user's interests, the device may automatically perform (in the background, while the book is being played back) a search based on the recently read out portion of the book and the particular interest, and re-rank at least a portion of the (e.g., top 10) results based on the particular interest. The device may temporarily pause play back of the book, indicate that a recently read out portion of the book matches a particular user interest and ask if the user desires to find out more information. If the user indicates a desire to find out more, the device may read out the re-ranked results. The user may ask additional questions and the device may perform additional searches, re-rank the additional search results, and read out the re-ranked additional search results. The device may resume play back of the book in response to the user instructing the device to resume play back of the book.

Figure 2:
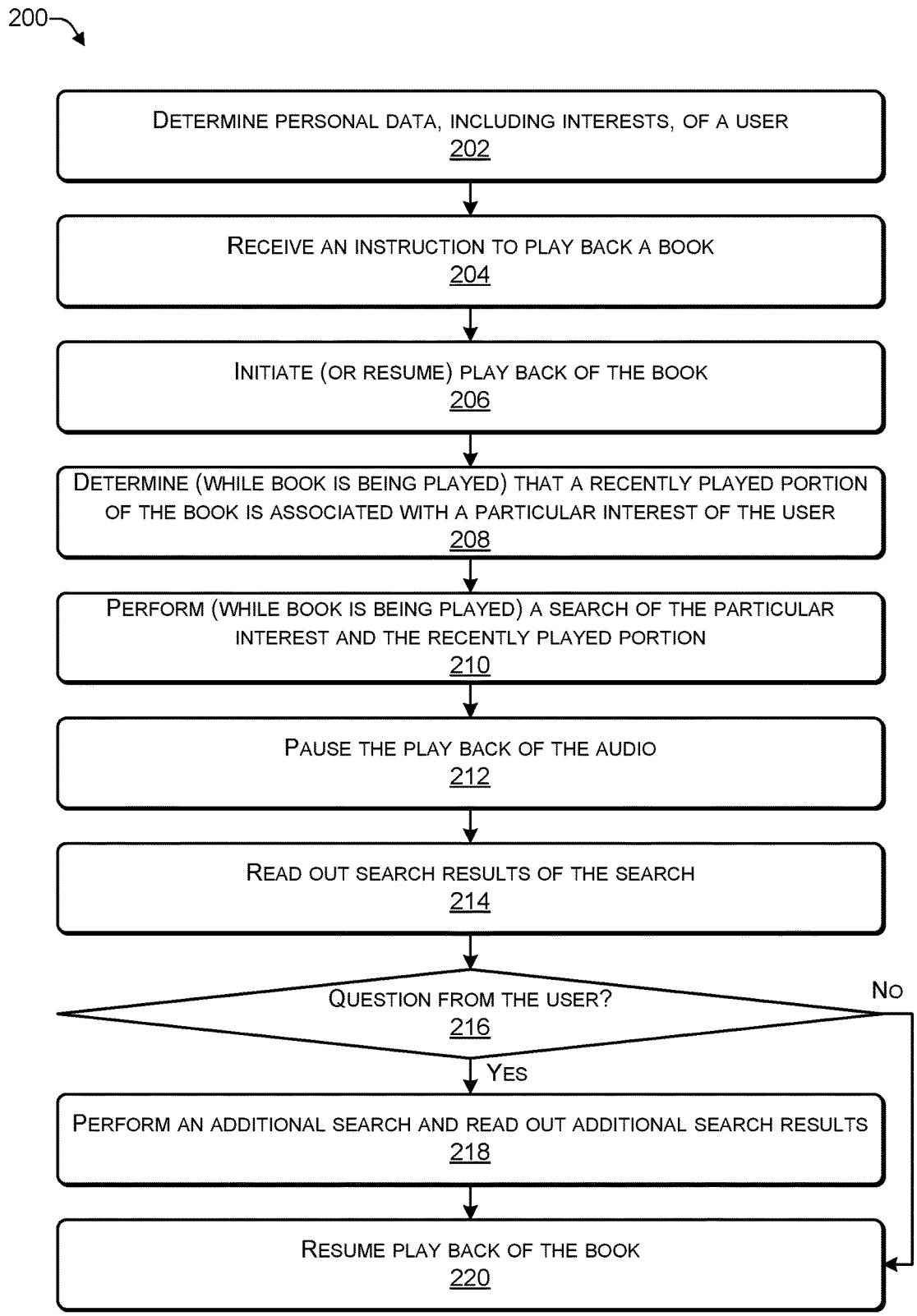
FIG. 2 is a flowchart of a process that includes initiating play back of audio associated with a book, according to some embodiments.
Figure 3:
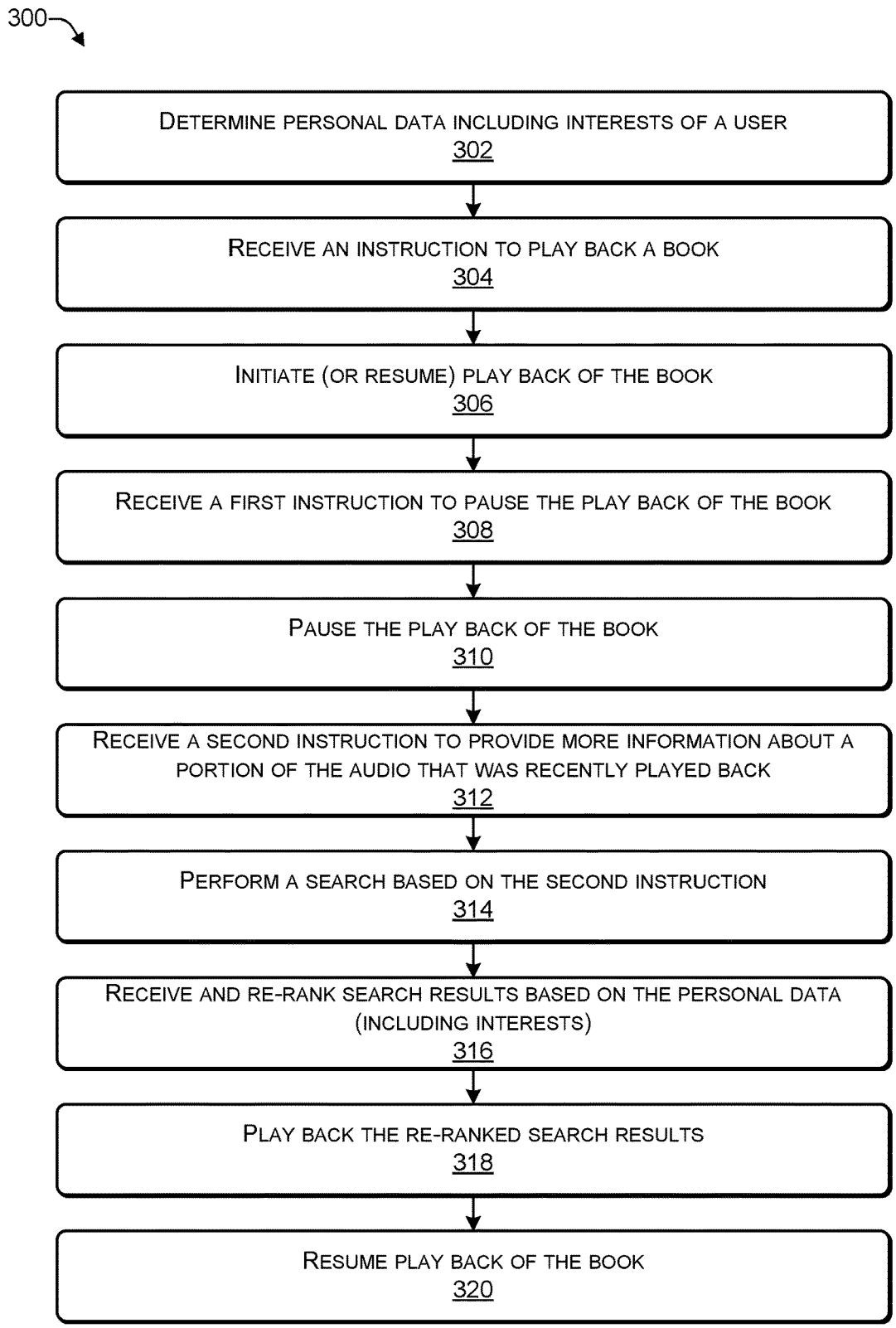
FIG. 3 is a flowchart of a process that includes performing a search, according to some embodiments.
Figure 4:
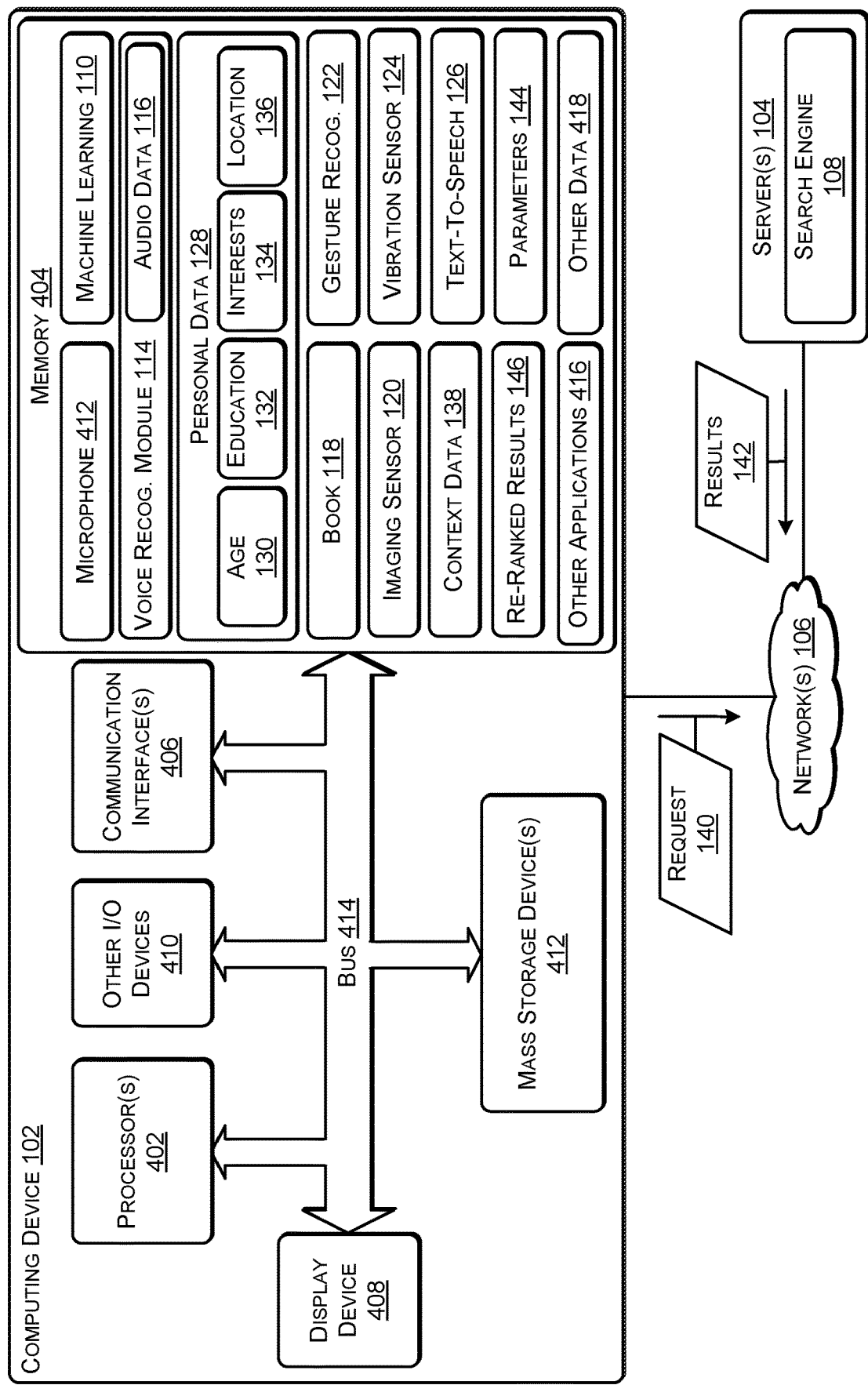
FIG. 4 illustrates an example configuration of a computing device that can be used to implement the systems and techniques described herein.

In the flow diagram of FIGS. 2, 3, and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200, 300, and 400, are described with reference to FIG. 1, as described above, although other models, frameworks, systems and environments may be used to implement these processes.

FIG. 2 is a flowchart of a process 200 that includes initiating play back of audio associated with a book, according to some embodiments. The process 200 may be performed by one or more components of the computing device 102 of FIG. 1.

At 202, personal data, including interests, of a user may be determined. For example, in FIG. 1, when the computing device 102 determines that a new user is using the computing device 102, the computing device 102 may gather personal data 128 associated with the new user and store the personal data 128 in a memory of the computing device 102. For example, to determine the user's interests 134, the computing device 102 may ask the user questions, analyze the user's browser history (e.g., of an internet browser application), analyze the user's postings on social media sites, analyze files (e.g., music files, video files, audio books, books, documents, and the like) stored on the computing device 102, and the like. The computing device 102 may periodically (e.g., every week, every month, every 6 months, or the like) update the user's interests 134.

At 204, an instruction to play back a book may be received. At 206, play back of the book may be initiated (or resumed). For example, in FIG. 1, the user may instruct the computing device 102 to read out loud a particular book, such as the book 118. The microphone 112 may capture what the user said in the form of the audio data 116. The voice recognition module 114 may perform an analysis of the audio data 116 and begin (or resume) reading out loud a portion of the book 118 based on the analysis. If the book 118 is an audio file, the voice recognition module 114 may begin (or resume) play back the audio file. If the book 118 is an eBook, the voice recognition module 114 may instruct the TTS module 126 to begin (or resume) reading the book from a particular location.

At 208, a background process may determine, while the book is being played, that a recently played portion of the book is associated with a particular one of the interests of the user. At 210, a background process may perform, while the book is being played, a search based on the recently played portion of the book and the particular one of the interests of the user. At 212, the play back of the audio may be paused. At 214, search results (or re-ranked results) may be read out. For example, in FIG. 1, when the computing device 102 is reading out loud the book 118, the computing device 102 may automatically, using a background process, determine the context data 138 (e.g., a content of the passages being read from the book 118) and compare (e.g., using the machine learning 110) the context data 138 to the personal data 128 (e.g., including the interests 134). If the context data 138 of the book 118 matches the personal data 128, the computing device 102 may automatically send the search request 140 in the background (e.g., while the book 118 is being read), receive the search results 142, and re-rank the search results 142 based on the context data 138. The computing device 102 may pause play back of the book 118 and ask the user if the user desires to find out more about the context data 138 (e.g., content in the passages being read) based on the user's similar personal data 128, including the user's similar interests 134. If the user indicates a desire to hear the re-ranked results 146, the computing device 102 may read out the re-ranked results 146. After the user provides a command (e.g., via a voice command, via a gesture, or via a vibration inducing tap) to resume play back of the book 118, the computing device 102 may resume play back of the book 118.

At 216, a determination may be made whether the user has asked a question. In response to determining, at 216, that the user has asked a question, the process may proceed to 218, where an additional search may be performed and results of the additional search may be read out loud. In response to determining, at 216, that the user has not asked a question, the process may proceed to 220. At 220, play back of the book may be resumed. For example, in FIG. 1, if the user asks a question, the computing device 102 may send an additional search request, receive additional search results, re-rank the additional search results, and read out loud the one or more re-ranked search results. If the user does not ask a question, the computing device 102 may automatically, after pausing for a predetermined period of time (e.g., Y seconds, where Y>0) resume play back of the book 118.

Thus, a computing device may respond to voice commands provided by a user. The first time that user uses the device, the device may gather personal data associated with the user, including interests of the user. The user may instruct the device to read out an audio version of a book. In response, the device may play back an audio file of a human reading the book or the device may use text-to-speech to convert the text of the book to speech. While the device is playing back the audio file or when the device is using text-to-speech to convert the text of the book to speech, the device may use a background process to automatically compare (i) contents of the book that were recently (e.g., within a predetermined time interval) read out loud with (ii) the user's interests. If the content of the recently read out portion of the book matches a particular interest of the user's interests, the device may automatically perform (in the background, while the book is being played back) a search based on the recently read out portion of the book and the particular interest, and re-rank at least a portion of the (e.g., top 10) results based on the particular interest. The device may temporarily pause play back of the book, indicate that a recently read out portion of the book matches a particular user interest and ask if the user desires to find out more information. If the user indicates a desire to find out more, the device may read out the re-ranked results. The user may ask additional questions and the device may perform additional searches, re-rank the additional search results, and read out the re-ranked additional search results. The device may resume play back of the book in response to the user instructing the device to resume play back of the book.

FIG. 3 is a flowchart of a process 300 that includes performing a search, according to some embodiments. The process 300 may be performed by one or more components of the computing device 102 of FIG. 1.

At 302, personal data, including interests, of a user may be determined. For example, in FIG. 1, when the computing device 102 determines that a new user is using the computing device 102, the computing device 102 may gather personal data 128 associated with the new user and store the personal data 128 in a memory of the computing device 102. For example, to determine the user's interests 134, the computing device 102 may ask the user questions, analyze the user's browser history (e.g., of an internet browser application), analyze the user's postings on social media sites, analyze files (e.g., music files, video files, audio books, books, documents, and the like) stored on the computing device 102, and the like. The computing device 102 may periodically (e.g., every week, every month, every 6 months, or the like) update the user's interests 134.

At 304, an instruction to play back a book may be received. At 306, play back of the book may be initiated (or resumed). For example, in FIG. 1, the user may instruct the computing device 102 to read out loud a particular book, such as the book 118. The microphone 112 may capture what the user said in the form of the audio data 116. The voice recognition module 114 may perform an analysis of the audio data 116 and begin (or resume) reading out loud a portion of the book 118 based on the analysis. If play back is being resumed, the location in the book 118 where play back is resumed may be determined using the context data 138. If the book 118 is an audio file, the voice recognition module 114 may begin (or resume) play back the audio file. If the book 118 is an eBook, the voice recognition module 114 may instruct the TTS module 126 to begin (or resume) reading the book from a particular location.

At 308, a first instruction may be received to pause play back of the book. At 310, play back of the book may be paused. At 312, a second instruction may be received to provide more information about a portion of the audio that was recently played back. At 314, a search (e.g., associated with content of the portion of the audio that was recently played back) may be performed. For example, in FIG. 1, the computing device 102 may play back (e.g., read) the book 118. The user may pause play back of the book 118 via an audible command or via a gesture (e.g., raise a hand near the imaging sensor 120, tap the computing device 102 such that the vibration sensor 124 detects the ta, or the like). When play back of the book 118 is paused, the computing device 102 may store context data 138 that includes a location in the book 118 where play back was paused and information associated with a most recent passage (e.g., sentence, paragraph, section, chapter, or the like) of the book 118 that was played back. After pausing play back, the user may ask a question related to the most recently read passage of the book 118. The microphone 112 may capture the question in the form of the audio data 116. The voice recognition module 14 may analyze the audio data 116 to determine the information that the user is requesting in the question and send (via the network 106) a search request 140 to the search engine 108.

At 316, the search results may be received and re-ranked based on the personal data (including the user's interests). At 318, the re-ranked search results may be played back. At 320, play back of the book may be resumed. In response to sending the search request 140 to the search engine 108, the computing device 102 may receive search results 142. The computing device 102 may re-rank the search results 142 to create re-ranked results 146. For example, the computing device 102 may re-rank the search results 142 based on the relevancy of each of the search results 142 to the context data (e.g., the most recent passages read out from the book). The computing device 102 may use the text-to-speech module 126 to read out loud the re-ranked results 146. If the user asks an additional question, the computing device 102 may send an additional search request, receive additional search results, re-rank the additional search results, and read out loud the one or more re-ranked search results. If the user instructs (e.g., via a voice command, via a gesture, or via a vibration inducing tap) the computing device 102 to resume play back of the book 118, the computing device 102 may resume play back of the book 118. The device may resume play back of the book 118 at a location in book 118 determined based on the context data 138.

Thus, a computing device may respond to voice commands provided by a user. The first time that user uses the device, the device may gather personal data associated with the user, including interests of the user. The user may instruct the device to read out an audio version of a book. In response, the device may play back an audio file of a human reading the book or the device may use text-to-speech to convert the text of the book to speech. The user may instruct the device to pause play back and may instruct the device to obtain (e.g., via an internet search) information associated with the content of the book that was recently (e.g., within a predetermined time interval) read out loud. The device may perform a search, re-rank at least a portion of the (e.g., top 10) results based on the user's interests, and read out the portion of the re-ranked results. The user may ask additional questions and the device may perform additional searches, re-rank the additional search results, and read out the re-ranked additional search results until the user instructs the device to resume play back of the book.

FIG. 4 illustrates an example configuration of the computing device 102 that can be used to implement the systems and techniques described herein. The computing device 102 may include one or more processors 402 (e.g., CPU, GPU, or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 116 and mass storage devices 412, may be used to store software and data. For example, the computer storage media may be used to store the operating system 110 (with the API 132), the browser 112 (that can be navigated to the search site 122), the enhanced search module 114, the microphone 116, the voice assistant 136, the buffer 118 (in which the audio data 120 is stored), other software applications 416, and other data 418.

Thus, the computing device 102 may respond to voice commands from a user. The first time that a user uses the computing device 102, the computing device 102 may gather the personal data 128 associated with the user, including the interests 134 of the user. The user may instruct the computing device 102 to play back the book 118. In response, the computing device 102 may play back an audio file of a human reading the book 118 or the computing device 102 may use the text-to-speech module 126 to convert the text of the book 118 to speech. The user may instruct the computing device 102 to pause play back and may instruct the computing device 102 to obtain (e.g., via an internet search) information associated with the content of the book 118 that was recently (e.g., within a predetermined time interval) read out loud. The computing device 102 may send the search request 140, receive the search results 142, re-rank at least a portion of the (e.g., top 10) results 142 based on the user's interests 134 to create the re-ranked results 146, and read out the portion of the re-ranked results 146. The user may ask additional questions and the computing device 102 may perform additional searches, re-rank the additional search results, and read out the re-ranked additional search results until the user instructs the computing device 102 to resume play back of the book 118.

When the computing device 102 is playing back the audio book 118 or when the device is using text-to-speech to convert the text of the book 118 to speech, the computing device 102 may use a background process to automatically compare (i) contents of the book 118 that were recently (e.g., within a predetermined time interval) read out loud with (ii) the user's interests 134. If the content of the recently read out portion of the book 118 matches a particular interest of the user's interests 134, the computing device 102 may automatically send (in the background, while the book 118 is being played back) the search request 140 based on the recently read out portion of the book and the particular one of the interests 134, and re-rank at least a portion of the (e.g., top 10) results 142 based on the interests 134. The computing device 102 may temporarily pause play back of the book 118, indicate that a recently read out portion of the book 118 matches one or more of the interests 134 and ask if the user desires to find out more information. If the user indicates a desire to find out more, the computing device 102 may read out the re-ranked results 146. The user may ask additional questions and the computing device 102 may perform additional searches, re-rank the additional search results, and read out the re-ranked additional search results. The computing device 102 may resume play back of the book 118 in response to the user instructing the computing device 102 to resume play back of the book.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by the one or more processors of a computing device that comprises a display device, an instruction to audibly play back a book, which is stored in memory of the computing device in an electronic format that enables the electronic book to be displayed on the display device for reading by a user;
   initiating, by the one or more processors executing instructions of a text to speech converter, audible play back of the book;
   determining, by the one or more processors and while the book is being audibly played back, that the computing device is being shaken;
   in response to determining that the computing device is being shaken, determining that content in a recently played back portion of the book matches at least one interest of one of more interests associated with the user, wherein the content is matched with the at least one interest using a machine learning module configured to compare the content to the at least one interest, and wherein the one or more interests associated with the user are identified using interest determination processing, the interest determination processing including:
      receiving one or more answers in response to asking the user one or more questions;
      performing a first analysis of a browser history of an internet browser application;
      performing a second analysis of posts made by the user on one or more social media sites;
      performing a third analysis of files stored in the memory, the files including music files, video files, audio books, books stored in electronic format, and documents;
      combining the one or more answers with the first analysis, the second analysis, and the third analysis to obtain personal data of the user; and
      using the combined personal data to determine the one or more interests associated with the user;
   sending, by the one or more processors and while the book is being audibly played back, a search request to a search engine, the search request formulated based on the content in the recently played back portion of the book and the at least one interest;

pausing, by the one or more processors, the audible play back of the book without receiving an associated instruction from the user;

audibly prompting the user whether the user wishes to learn more about the content and the at least one interest associated with the user;

in response to determining that the user wishes to learn more about the content and the at least one interest, initiating, by the one or more processors executing instructions of the text to speech converter, audible play back of search results received from the search engine based on the search request; and resuming, by the one or more processors executing instructions of a text to speech converter, the audible play back of the book.

2. The method of claim 1, further comprising:

determining an approximate age of the user;

determining an approximate education level associated with the user;

determining an education specialty associated with the user;

determining an approximate location of the user; and combining the approximate age, the approximate education level, the education specialty, and the approximate location of the user with the personal data to determine the one or more interests associated with the user.

3. The method of claim 1, wherein the book is stored in the memory in PDF format.

4. The method of claim 1, wherein determining, while the book is being audibly played back, that the content in the recently played back portion of the book matches the at least one interest of the one of more interests associated with the user comprises:

while the book is being audibly played back, executing a background process to:
  determine the content in the recently played back portion of the book;
  perform a comparison of the content with the one or more interests associated with the user; and
  determine, based on the comparison, that the content in the recently played back portion of the book matches the at least one interest of the one of more interests associated with the user.

5. The method of claim 1, further comprising:

receiving a second instruction to pause audible play back of the book;

pausing audible play back of the book in response to the second instruction;

receiving a third instruction to provide more information about the content in the recently played back portion of the book;

sending an additional search request to the search engine, the additional search request formulated based on the content in the recently played back portion of the book;

receiving additional search results from the search engine; and audibly playing back at least a portion of the additional search results.

6. The method of claim 1, wherein reading out loud the search results received from the search engine comprises:

receiving, while the book is being audibly played back, search results from the search engine in response to sending the search request to the search engine;

re-ranking the search results based on the one or more interests associated with the user to create re-ranked search results; and audibly reading out the re-ranked search results.

7. A computing device comprising:

a display device;

a memory;

one or more processors; and one or more non-transitory computer readable media storing instructions executable by the one or more processors to perform operations comprising:

receiving an instruction to audibly play back a book, which is stored in the memory in an electronic format that enables the electronic book to be displayed on the display device for reading by a user;

initiating audible play back of the book by executing instructions of a text to speech converter in the non-transitory computer readable media;

determining, while the book is being audibly played back, that the computing device is being shaken;

in response to determining that the computing device is being shaken, determining that content in a recently played back portion of the book matches at least one interest of one of more interests associated with the user, wherein the content is matched with the at least one interest using a machine learning module configured to compare the content to the at least one interest, and wherein the one or more interests associated with the user are identified using interest determination processing, the interest determination processing including:
  receiving one or more answers in response to asking the user one or more questions;
  performing a first analysis of a browser history of an internet browser application;
  performing a second analysis of posts made by the user on one or more social media sites;
  performing a third analysis of files stored in the memory, the files including music files, video files, audio books, books stored in electronic format, and documents;
  combining the one or more answers with the first analysis, the second analysis, and the third analysis to obtain personal data of the user; and
  using the combined personal data to determine the one or more interests associated with the user;

sending, while the book is being audibly played back, a search request to a search engine, the search request formulated based on the content in the recently played back portion of the book and the at least one interest;

pausing the audible play back of the book without receiving an associated instruction from the user;

audibly prompting the user whether the user wishes to learn more about the content and the at least one interest associated with the user;

in response to determining that the user wishes to learn more about the content and the at least one interest, initiating, by executing instructions of the text to speech converter, audible play back of search results received from the search engine based on the search request; and resuming the audible play back of the book.

8. The computing device of claim 7, wherein the operations further comprise:

determining an approximate age of the user;

determining an approximate education level associated with the user;
determining an education specialty associated with the user;
determining an approximate location of the user; and
combining the approximate age, the approximate education level, the education specialty, and the approximate location of the user with the personal data to determine the one or more interests associated with the user.

9. The computing device of claim 7, wherein the book is stored in the memory in PDF format.

10. The computing device of claim 7, wherein determining, while the book is being audibly played back, that the content in the recently played back portion of the book matches the at least one interest of the one of more interests associated with the user comprises:
while the book is being audibly played back, executing a background process to:
determine the content in the recently played back portion of the book;
perform a comparison of the content with the one or more interests associated with the user; and
determine, based on the comparison, that the content in the recently played back portion of the book matches the at least one interest of the one of more interests associated with the user.

11. The computing device of claim 7, wherein reading out loud the search results received from the search engine comprises:
receiving, while the book is being audibly played back, the search results from the search engine in response to sending the search request to the search engine;
re-ranking the search results based on the one or more interests associated with the user to create re-ranked search results; and
audibly reading out the re-ranked search results.

12. One or more non-transitory computer readable media storing instructions executable by one or more processors of a computing device that comprises a memory and a display device, wherein a method is implemented in response to executing the instructions, the method comprising:
receiving a first instruction to audibly play back a book, which is stored in the memory in an electronic format that enables the electronic book to be displayed on the display device for reading by a user;
initiating audible play back of the book by executing instructions in the one or more non-transitory computer readable media, of a text to speech converter;
determining, while the book is being audibly played back, that the computing device is being shaken;
in response to determining that the computing device is being shaken, determining that a content in a recently played back portion of the book matches at least one interest of one of more interests associated with the user, wherein the content is matched with the at least one interest using a machine learning module configured to compare the content to the at least one interest, and wherein the one or more interests associated with the user are identified using interest determination processing, the interest determination processing including:
receiving one or more answers in response to asking the user one or more questions;
performing a first analysis of a browser history of an internet browser application;
performing a second analysis of posts made by the user on one or more social media sites;
performing a third analysis of files stored in the memory, the files including music files, video files, audio books, books stored in electronic format, and documents;
combining the one or more answers with the first analysis, the second analysis, and the third analysis to obtain personal data of the user; and
using the combined personal data to determine the one or more interests associated with the user;
sending, while the book is being audibly played back, a search request to a search engine, the search request formulated based on the content in the recently played back portion of the book and the at least one interest;
pausing the audible play back of the book without receiving an associated instruction from the user;
audibly prompting the user whether the user wishes to learn more about the content and the at least one interest associated with the user;
in response to determining that the user wishes to learn more about the content and the at least one interest, initiating, by executing instructions of the text to speech converter, audible play back of search results received from the search engine based on the search request; and
resuming the audible play back of the book.

13. The one or more non-transitory computer readable media of claim 12, wherein the operations further comprise:
determining an approximate age of the user;
determining an approximate education level associated with the user;
determining an education specialty associated with the user;
determining an approximate location of the user; and
combining the approximate age, the approximate education level, the education specialty, and the approximate location of the user with the personal data to determine the one or more interests associated with the user.

14. The one or more non-transitory computer readable media of claim 12, wherein the book is stored in the memory in PDF format.

15. The one or more non-transitory computer readable media of claim 12, wherein determining, while the book is being audibly played back, that the content in the recently played back portion of the book matches the at least one interest of the one of more interests associated with the user comprises:
while the book is being audibly played back, executing a background process to:
determine the content in the recently played back portion of the book;
perform a comparison of the content with the one or more interests associated with the user; and
determine, based on the comparison, that the content in the recently played back portion of the book matches the at least one interest of the one of more interests associated with the user.

16. The one or more non-transitory computer readable media of claim 12, further comprising:
receiving a second instruction to pause audible play back of the book;
pausing audible play back of the book in response to the second instruction;
receiving an additional instruction to provide more information about the content in the recently played back portion of the book;

sending an additional search request to the search engine, the additional search request formulated based on the content in the recently played back portion of the book;
receiving additional search results from the search engine; and
audibly playing back at least a portion of the additional search results.

17. The one or more non-transitory computer readable media of claim 12, wherein reading out loud the search results received from the search engine comprises:
receiving, while the book is being audibly played back, search results from the search engine in response to sending the search request to the search engine;
re-ranking the search results based on the one or more interests associated with the user to create re-ranked search results; and
audibly reading out the re-ranked search results.

* * * * *